United States Patent [19]
Baker, Jr. et al.

[11] Patent Number: 4,723,744
[45] Date of Patent: Feb. 9, 1988

[54] CAMPER STORAGE STAND

[76] Inventors: James D. Baker, Jr., 8716 Maxwell, Warren, Mich. 48089; Cecil E. Baker, Jr., 47 E. Mapledale, Hazel Park, Mich. 48030

[21] Appl. No.: 892,860

[22] Filed: Aug. 4, 1986

[51] Int. Cl.$^4$ .............................................. B66F 7/26
[52] U.S. Cl. .................................... 248/165; 248/352; 254/45
[58] Field of Search ............... 248/165, 188.1, 499, 248/671, 678, 352; 182/179; 254/45; 108/153

[56] References Cited

U.S. PATENT DOCUMENTS

| | | | |
|---|---|---|---|
| 2,556,611 | 6/1951 | Borgman | 182/179 |
| 3,337,171 | 8/1967 | Canning | 248/165 |
| 3,350,063 | 10/1967 | Thurlow, Sr. et al. | 254/45 |
| 3,409,154 | 11/1968 | Rasmussen | 214/515 |
| 3,409,272 | 11/1968 | Rasmussen | 254/45 |
| 3,415,490 | 12/1968 | Steele | 254/45 |
| 3,462,123 | 8/1969 | Oliver | |
| 3,507,476 | 4/1970 | Bennett | 245/45 |
| 3,532,236 | 10/1970 | Hostetler | 214/515 |
| 3,567,271 | 3/1971 | Gostomski | 296/23 |
| 3,580,599 | 5/1971 | Dodgen et al. | 280/34 |
| 3,622,193 | 11/1971 | Schmidt | 296/23 |
| 3,635,366 | 1/1972 | Dodgen | 214/515 |
| 3,640,502 | 2/1972 | Bargman, Jr. | 254/45 |
| 3,679,174 | 7/1972 | Boettcher | 254/45 |
| 3,689,029 | 9/1972 | Bargman, Jr. | 254/45 |
| 3,711,133 | 1/1973 | Werner | 248/188.1 |
| 3,758,074 | 9/1973 | Jeffries et al. | 254/45 |
| 3,926,393 | 12/1975 | Tainsh | 248/165 |
| 4,025,211 | 5/1977 | Gump | 182/179 |
| 4,314,726 | 2/1982 | Artweger et al. | 296/164 |

FOREIGN PATENT DOCUMENTS

| | | | |
|---|---|---|---|
| 812591 | 9/1951 | Fed. Rep. of Germany | 248/499 |
| 1472872 | 1/1967 | France | 248/188.1 |
| 1501761 | 10/1967 | France | 182/179 |
| 184223 | 5/1936 | Switzerland | 248/165 |
| 391995 | 9/1965 | Switzerland | 248/188.1 |
| 587921 | 5/1947 | United Kingdom | 5/507 |

Primary Examiner—Reinaldo P. Machado
Assistant Examiner—Alvin Chin-Shue
Attorney, Agent, or Firm—Gifford, Groh, VanOphem, Sheridan, Sprinkle and Dolgorukov

[57] ABSTRACT

A support for use in conjunction with a camper (carriable by a conveying vehicle) and a plurality of conventional lifting jacks is constructed from square cross section ferrous tubing. The support is collapsible from an assembled state in which it supportively abuts the bottom of the camper when the camper is not carried by the vehicle. The support eases at least a significant portion of the load of the camper from the jacks, so as to avoid buckling of the camper sides by the jacks. Preferably, the jacks are maintained in position to stabilize the camper against transverse movement caused by wind or by movement inside the camper. The support is constructed from a pair of opposing end elements, each having a pair of vertical members connected by a horizontal cross member, and an upwardly opening socket on the upper ends of the vertical members. The support also includes a pair of connecting elements each having a pair of vertical legs, dimensioned to be slidably received in the sockets, which are connected by a horizontal side member.

16 Claims, 7 Drawing Figures

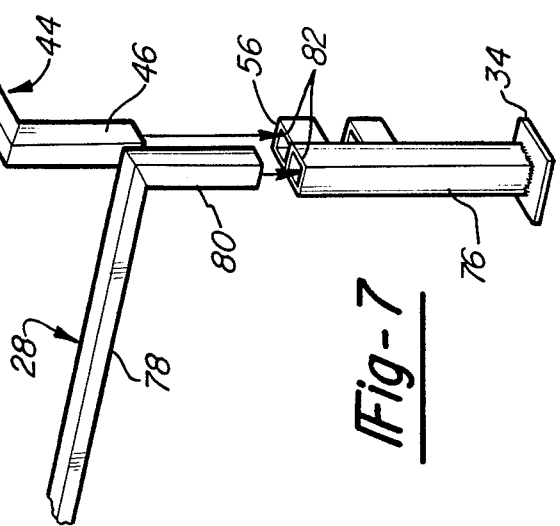
Fig-7
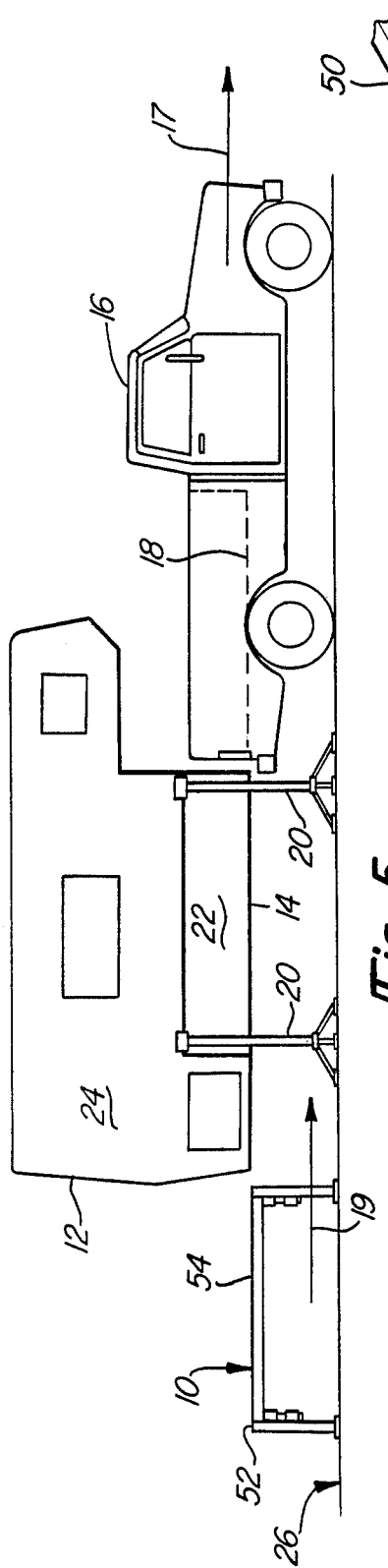
Fig-5
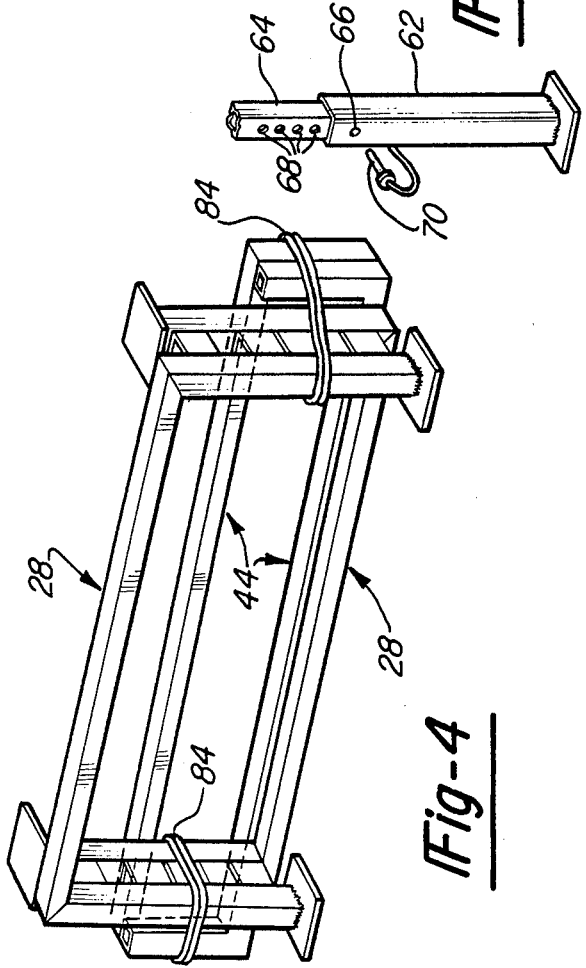
Fig-6
Fig-4

CAMPER STORAGE STAND

BACKGROUND OF THE INVENTION

I. Field of the Invention

The present invention relates to support structures, and more particularly to a support or stand for a camper or coach body.

II. Description of the Prior Art

Camper or coach bodies (hereinafter "campers") are popular outdoor recreational devices which provide mobile, compact living and cargo space. Campers are conventionally detachably carried upon the bed of a conveying vehicle. Detachment of the camper from the vehicle allows the vehicle to be employed for other purposes. Typically, lifting equipment such as a plurality of jacks is employed to remove the camper from the vehicle and deposit it, either temporarily or for storage, at a desired location, and permit the vehicle to be used for those other purposes. For example, the users may desire to establish the camper as a temporary residence at a campsite, so that some of the users may remain at the campsite, while others operate the vehicle independently of the camper.

A wide variety of fixed, detachable or separate jacks, with or without mechanical or hydraulic assists, have been employed to support the camper while disengaged from the conveying vehicle. However, this conventional use of lifting jacks for support purposes has been subject to several drawbacks. The typical separate jacks are usually sufficiently strong to lift the camper, but are occasionally subject to slippage or malfunction, and so cannot be considered completely reliable or safe to support the camper above the ground for an extended time. Of course, such support is necessary to rusting or dry rot of the camper bottom, on account of contact with the ground. The conventional use of the typical jacks is also likely to cause some buckling of the sides of the camper at the points where the camper rests on the jacks. These drawbacks are particularly acute when the weight of one or more individuals is added to the weight of the camper, when the camper is used as a temporary residence.

One attempt at a solution to these drawbacks has been to rest the camper on a plurality of relatively small props, such as posts, milk crates or cinder blocks. This attempt has its own drawbacks, however. The blocks must be individually positioned beneath the camper bottom while the camper is supported by conventional jacks. This entails some risk to the user, in case one or more jacks would give away, and alignment of the individual blocks is inconvenient at best. Additionally, a camper supported only by separate blocks often lacks stability against winds or movement of individuals inside the camper.

Another attempt at a solution to these drawbacks is the permanent affixment of pivotable jacks to the camper sides. Such affixment often disadvantageously entails perforation of the camper sidewalls. If the jacks are not positioned carefully, particularly if they are not affixed to framing members within the camper, such affixment will not solve the problem of buckling. Indeed, jacks bolted to only the exterior sidewall of the camper can tear away from the sidewall, with disastrous results. While hydraulically or mechanically assisted jacks can be constructed to meet these problems, they are costly.

SUMMARY OF THE PRESENT INVENTION

The present invention overcomes these and other drawbacks by providing a safe and sturdy low cost support or stand for a camper removed from its conveying vehicle. The support is used in conjunction with a plurality of conventional camper jacks. The support includes an upper surface generally dimensioned in conformance with the peripheral dimensions of the camper bottom, upon which the camper bottom then rests. The support removes all or a substantial majority of the weight of the camper from the jacks. Preferably, however, the jacks are not removed when the support is employed, but instead remain in position to stabilize the camper against tippage, such as by strong winds or movement of users about or within the camper. The amount of weight relieved by the support is, in any case, at least enough to avoid buckling of the camper sides by the jacks when the camper remains removed from the conveying vehicle.

The combination of the present invention is thus less destructive to the camper sides than has been the prior use of jacks alone, and is also safer than the use of a plurality of smaller props, since the support is large enough to be manipulated beneath the camper bottom without requiring the user to crawl beneath the camper as is the case with smaller props. The support does not require permanent affixment to or perforation of any portion of the camper. Preferably, the support is collapsible to a size small enough to be carried within the camper when the camper is conveyed on the vehicle. The support is substantially less expensive than are the prior hydraulically or mechanically assisted jacks.

The support or stand of the present invention is preferably constructed of hollow steel tubing and comprises a pair of opposing end elements detachably connected to a pair of connecting elements extending therebetween, which together define a quadrilateral shaped upper surface generally conforming to the peripheral dimensions of the camper bottom. The end elements each preferably comprise a pair of vertical members having a horizontal cross member extending therebetween, and an upwardly opening socket means adjacent the upper ends of the vertical members. The connecting elements each preferably comprise a pair of vertical legs dimensioned to be received in the socket means on the vertical members, and a side member extending between them.

BRIEF DECSRIPTION OF THE DRAWING

A better understanding of the present invention will be had upon reference to the following detailed description, when read in conjunction with the accompanying drawing, wherein like reference characters refer to like parts throughout the several views, and in which:

FIG. 4 is another perspective view of the preferred embodiment of the present invention;

FIG. 5 is another perspective view of the preferred embodiment of the present invention;

FIG. 6 is a perspective view of a portion of another preferred embodiment of the present invention; and FIG. 7 is an exploded perspective view of a portion of another preferred embodiment of the present invention.

DETAILED DESCRIPTION OF THE PREFERRED EMBODIMENT OF THE PRESENT INVENTION

Figure 1:
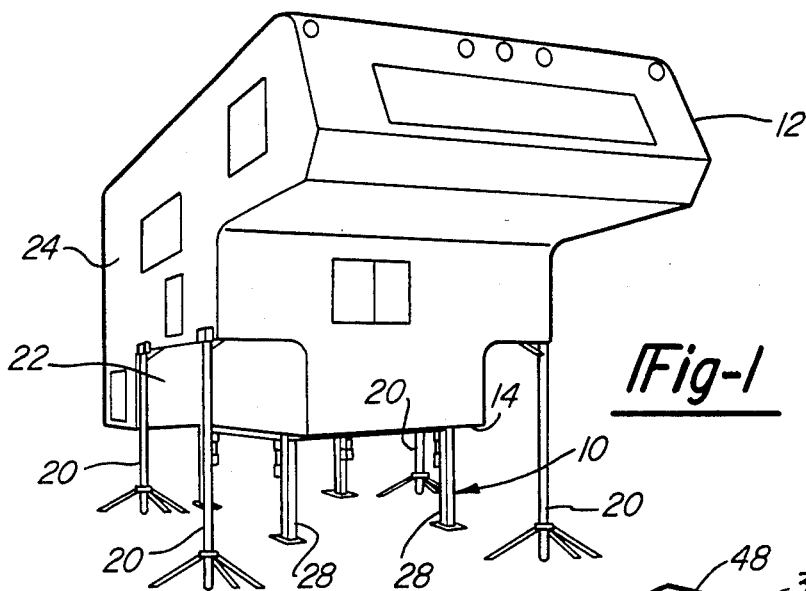
FIG. 1 is a perspective view of the preferred embodiment of the present invention.

With reference first to FIG. 1, the camper support or stand 10 according to the present invention is thereshown positioned and abutting the bottom 14 of a camper or coach body 12. The support 10 is preferably employed in conjunction with a plurality of conventional lifting jacks 20. The upper ends of the jacks 20 abut the sidewalls 24 and sidewall recesses 22 of the camper 12. The support 10 and the jacks 20 thus together serve to support the camper 12 off the ground 26.

Figure 2:
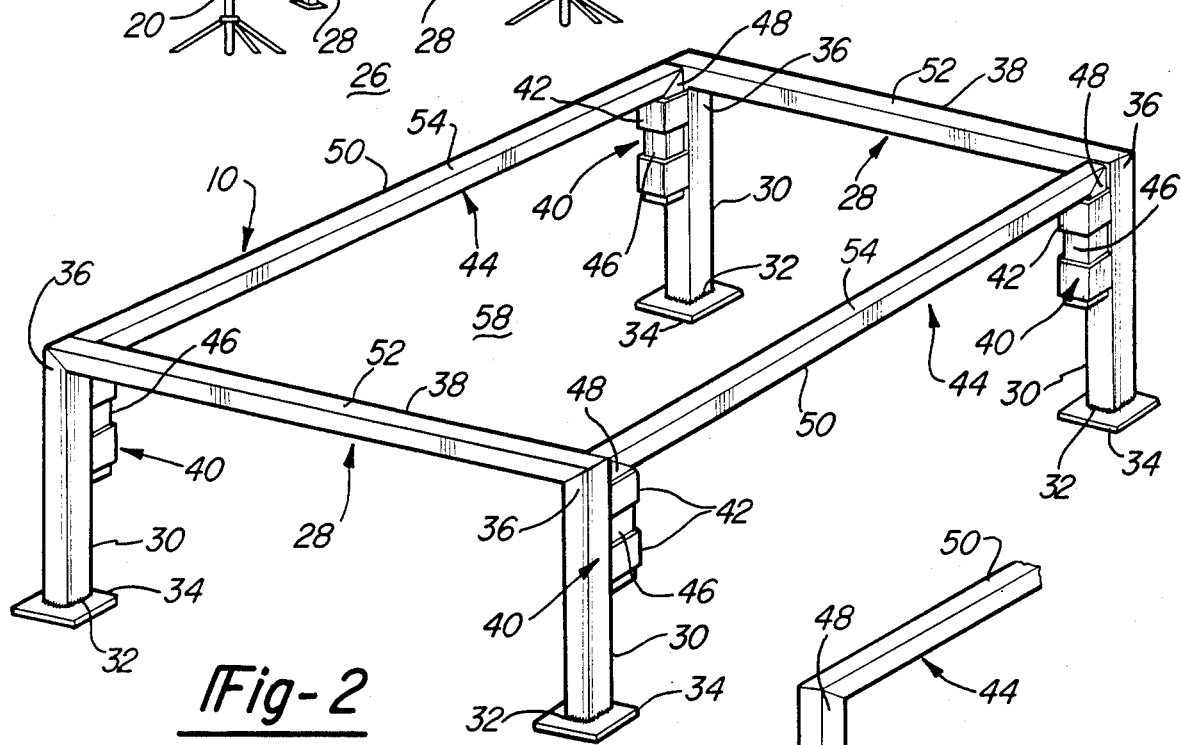
FIG. 2 is another perspective view of the preferred embodiment of the present invention.
Figure 3:
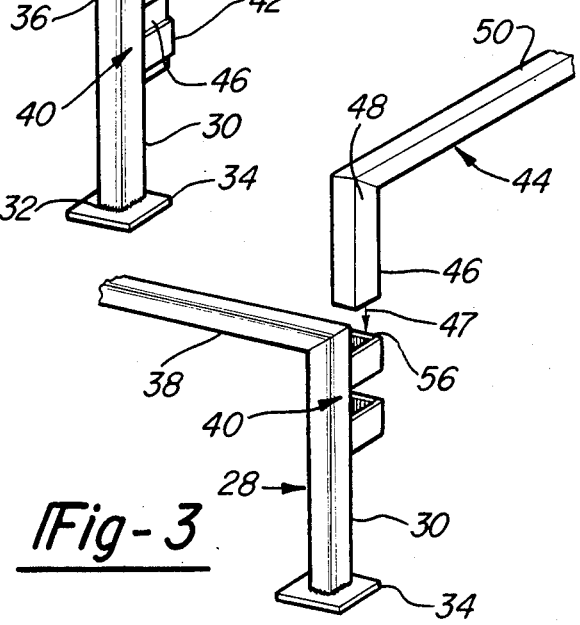
FIG. 3 is an exploded perspective view of a portion of the preferred embodiment of the present invention.

With reference now to FIGS. 2 and 3, the support 10 is thereshown in more detail. The support 10 first comprises an opposing pair of end elements 28 each comprising a pair of vertical members 30 and a horizontal cross member 38 extending between and connecting the upper ends 36 of the vertical members 30. Each of the vertical members 30 preferably includes a ground-abutting pad 34 affixed to a lower end 32 of the vertical member 30. Each of the end elements 28 also comprises a socket means 40 disposed adjacent but spaced slightly downwardly from the upper end 36. Preferably, the socket means 40 comprises a pair of tube segments 42 affixed to the sides of the vertical members 30.

The tube segments 42 are dimensioned to receive one of a pair of connecting elements 44 therein. More particularly, the connecting elements 44 comprise a pair of vertical legs 46 and a horizontal side member 50 connected to and extending between the upper ends 48 of the vertical leg 46. The tube segments 42 are dimensioned to slidably receive the vertical legs 46 therein.

The end elements 28 each comprise a coplanar upper surface 52 adapted to receive the bottom 14 of the camper 12 thereon. An upper edge 56 of each of the socket means 40 is spaced beneath the upper surface 52 a distance substantially equal to the vertical thickness of the horizontal side members 50. The connecting elements 44 also comprise a pair of upper surfaces 54, coplanar with each other, and coplanar with the upper surfaces 52 of the end elements 28. Thus, when the connecting elements 44 are received in the socket means 40, by insertion of the vertical legs 46 into the tube segments 42, the end elements 28 and the connecting elements 44 together define an open, quadrilateral and preferably rectangular space 58 therebetween, whose limits are defined by the upper surfaces 52 and 54. The open space 58 is preferably dimensioned slightly smaller than the extend of the bottom 14 of the camper 12, so that the camper bottom 14 is restable upon the upper surfaces 52 and 54, as shown in FIG. 1.

Preferably the end elements 28 and connecting elements 44 are constructed from square cross sectioned ferrous tubing. The vertical members 30 and horizontal cross members 38 of the end elements 28 are constructed from 14 gauge, one and three-quarter inch ferrous tubing, diagonally cut and welded together. The tube segments 42 are constructed from 14 gauge, two inch square cross section ferrous tubing, and are welded to the sides of the vertical members 30. The vertical legs 46 and horizontal side members 50 of the connecting elements 44 are constructed from 11 gauge, one and three-quarter inch ferrous tubing. Thus, the vertical legs 46 are dimensioned to be slidably received in the tube segments 42, the travel of the vertical legs 46 in the segments 42 being stopped when the horizontal side members 50 come into abutment with the upper edges 56 of the tube segments 42. While the connected elements are described as being welded together, the use of different materials for the construction of the support 10 may admit of or require different means for fastening the pieces together. The selection of such fastening means should be well within the skill of any artisan.

Use of the camper stand 10 according to the present invention is straightforward. The end elements 28 are connected together by the positioning of the connecting elements 44 between them, with the vertical legs 46 of the connecting elements 44 being received in the socket means 40, as shown by arrow 47 in FIG. 3, so that the arrangement shown in FIG. 2 is attained. Most conveniently, as shown in FIG. 5 the support 10 is positioned immediately adjacent an end of the camper 12 opposite the conveying vehicle 16. Initially the camper 12 is carried on a bed 18 of the conveying vehicle 16. The camper 12 is removed from the vehicle bed 18 in the conventional manner, first by positioning the jacks 20 beneath and against the sides 24 of the camper 12 adjacent the recesses 22, and then actuating the jacks 20 to lift the camper 12 a sufficient distance above the vehicle bed 18 to allow the vehicle 16 to be driven away from the camper 12, in the direction of arrow 17. The support 10 is then immediately slid along the ground 26 in the direction of arrow 19 underneath and aligned with the bottom 14 of the camper 12. The jacks 20 are actuated to lower the camper 12 so that the bottom 14 of the camper 12 rests upon the upper surfaces 50 and 52 of the end elements 28 and connecting elements 44.

While the support 10 can be sufficiently sturdy to bear the entire weight of the camper 12 and associated users thereon, without the assistance of the jacks 20, it is only necessary that the stand 10 bear a sufficient portion of the weight of the camper 12 to obviate any buckling of the sides 24 of the camper 12 from the continued support by the jacks 20. Indeed, it is preferred that the jacks 20 are left in place beneath the camper 12, and bear a sufficient portion of the weight of the camper 12 to be maintained in place and trapped by friction between the camper 12 and the ground 26, in order to stabilize the camper 12 on the support 10 and provide the optimal resistance to movement from strong winds or motion of users inside the camper 12. The vehicle 16, now no longer supporting the camper 12, is free for use independent of the camper 12.

The camper 12 is removed from the support 10 and the jacks 20, and returned to the vehicle bed 18, by simply performing these steps in reverse. The jacks 20, if not already in location, are positioned between the camper 12 and ground 26 in abutment with the camper sides 24 and the recesses 22. The jacks 20 are then actuated to lift the camper 12 off the support 10, and the camper support 10 removed from beneath the bottom 14 of the camper 12. The jacks 20 are subsequently actuated to ensure that the bottom 14 of the camper 12 is a sufficient distance above the ground 26 to permit the vehicle 16 to be backed underneath the camper 12, in a direction opposite arrow 17. The vehicle 16 is backed until the vehicle bed 18 is positioned beneath the bottom 14 of the camper 12. The jacks 20 are then actuated to lower the camper 12 to the bed 18 of the vehicle 16, and removed for storage.

Conveniently, the vertical members 30 of the end elements 28 are dimensioned so that the upper surfaces 54 and 52 of the support 10 are spaced above the ground 26 a distance approximately equal to the height of the vehicle bed 18 above the ground. In this way, the length of time and the vertical distance through which the jacks 20 must move the camper 12 are minimized.

Subsequent to the removal of the support 10 from beneath the camper 12, the support 10 is dissembled by removing the vertical legs 46 of the connecting elements 44 from the socket means 40, moving them in a direction opposite arrow 47 (FIG. 3). Once dissembled, the support 10 is particularly convenient for storage, as shown in FIG. 4. The end elements 28 and the connecting elements 44 are positioned side by side and connected together by any convenient means, such as conventional elastic cords 84 having hooks (not shown) on the ends thereof. Of course, the cords 84 can be replaced by other fastening means.

The collapsible construction of the platform 10 allows it to be carried inside the camper 12 while the camper 12 is being transported by the vehicle 16 to different locations of use. Indeed, in most circumstances the camper 12 can still be used when the support 10 is collapsed and stored within the camper 12, since the compacted support shown in FIG. 4 has a width of only about 10 inches.

With particular reference now to FIG. 6, a portion of another preferred embodiment of the present invention is thereshown which includes a means 60 for varying the height of the upper surfaces 52 and 54 of the end elements 28 and connecting elements 44 above the ground 26. In this embodiment, the vertical members 30 each comprise a pair of telescoping tubes 62 and 64, and have a plurality of holes 66 and 68 formed in registry therethrough. A pin 70 fixes the relative positions of the tubes 62 and 64, thus fixing the length of the vertical members 30 and the height of the upper surfaces 52 and 54 above the ground.

Alternatively, the end elements 28 need not be formed as a single piece. As shown in FIG. 7, the end elements 28 can instead comprises a pair of separate vertical members 76 which receive the limbs 80 of a separate cross member 78 therein. The socket means 40 thus comprises not only the tube segment 42, but the open end and open interior of the vertical member 76. A top edge 82 of the vertical member 76 is horizontally level with the upper edge 56 of the uppermost tube segment 42, and the side member 50 of the connecting elements 44 and the cross members 78 have the same thickness.

The present invention thus provides a structurally simple, safe and inexpensive support for a camper when it is not carried by its conveying vehicle, yet which reduces or eliminates damage to the camper from contact with conventional jacks. Preferably the conventional jacks are used in conjunction with the support of the present invention so as to provide the widest possible base and greatest degree of stability against unintended movement. Most advantageously, the support 10 of the present invention is dimensioned commensurate with the camper bottom 14. The size of the support 10 allows it to be placed beneath the camper 12 without requiring that the user be positioned or extend any body portion beneath the bottom 14 of the camper 12. The likelihood of user injury from the unexpected failure of the jacks 20 is thus substantially reduced.

Having described our invention, however, many modifications thereto will become apparent to those skilled in the art to which it pertains, without deviation from the spirit of the present invention, as defined by the scope of the appended claims.

We claim:

1. A support apparatus for use in conjunction with a camper carriable by a conveying vehicle, said camper having at least two sides and a generally planar bottom; said support apparatus comprising:
   a support comprising:
      a pair of opposing end elements each comprising: a pair of vertical members each having a lower ground abutting end and an upper end opposite said lower end; a horizontal cross member perpendiculary affixed to and connecting said upper ends of said vertical members; and an upwardly opening socket means on each of said vertical members adjacent said upper ends of said vertical members; and
      a pair of connecting elements each comprising: a pair of vertical legs dimensioned to be received one each in one of said socket means on said vertical members, said vertical legs each having an upper end; and a horizontal side member perpendiculary affixed to said upper ends of said vertical legs;
      wherein said cross and side members each include an upper surface for receiving said camper bottom thereon when said vertical legs are received in said socket means, said upper surfaces being substantially coplanar and together defining a rectangular shape generally conforming to the peripheral dimensions of said camper bottom; and
   a plurality of jacks disposable about said support and engageable with said camper sides for moving said camper with respect to said vehicle, said jacks being of the type conventionally employed for supporting said camper above the ground when said camper is not carried by said vehicle;
   wherein said support is collapsible from a state in which it supportively abuts against said camper bottom when said camper is not carried by said vehicle, so as to ease a significant portion but not all of the load of said camper on said jacks, thereby avoiding buckling of said camper sides by said jacks when said jacks stabilize the resting of said camper bottom on said support.

2. The invention according to claim 1, wherein said socket means includes an edge abutable against said horizontal side members and spaced beneath said upper surfaces of said cross members a distance about equal to the thickness of said side members.

3. The invention according to claim 1, wherein said vehicle includes a bed on which said camper bottom rests, and wherein said vertical members are dimensioned so as to position said upper surfaces at a height about equal to the height of said bed.

4. The invention according to claim 1, wherein said cross members and said horizontal side members define a substantially open space between them.

5. The invention according to claim 1, wherein said end members additionally comprise a second upwardly opening socket means adjacent each of said first-mentioned socket means, and a pair of perpendicular portions on each of said cross members dimensioned to be received one each in said second socket means, such that said vertical members are disconnected from another when said perpendicular portions of said cross member are disengaged from said second socket means.

6. The invention according to claim 1, wherein said socket means on said vertical members are each attached to the same face of their respective end elements.

7. The invention according to claim 1, wherein said connecting elements and said end elements are constructed from square cross sectioned tubing.

8. The invention according to claim 7, wherein said end elements are constructed from 14 gauge, one and three-quarter inch ferrous tubing, and said connecting elements are constructed from 11 gauge, one and three-quarter inch ferrous tubing.

9. The invention according to claim 1, wherein each of said socket means comprises a vertically spaced pair of tubing segments.

10. The invention according to claim 9, wherein said tubing segments comprise 14 gauge, two inch square cross section ferrous tubing, welded to said vertical members.

11. The invention according to claim 1, wherein said support further comprises means for varying at least one of: the height of said upper surfaces of said cross members and said side members; the length of both of said cross members; and the length of said side members.

12. The invention according to claim 11, wherein said varying means comprises means for slidably receiving one of said members and legs through another of said legs and members, and means adjacent said receiving means for fixing said sliding reception.

13. The invention according to claim 12, wherein said fixing means includes a threaded aperture in said other of said legs and members, and a threaded member disposed in said aperture abutable against said one of said members and legs.

14. The invention according to claim 12, wherein said fixing means includes one hole in said other of said legs and members, a registrable plurality of holes in said one of said members and said legs, and a pin disposable through said one hole and one of said plurality of holes.

15. The invention according to claim 1, wherein said support further comprises means for maintaining said end and connecting members in a compacted position when said members are disconnected from one another and said support is collapsed.

16. The invention according to claim 15, wherein said compaction maintaining means comprises a plurality of elastic straps having hooks affixed to the ends thereof.

* * * * *